(12) United States Patent
Pereira

(10) Patent No.: US 6,253,988 B1
(45) Date of Patent: Jul. 3, 2001

(54) LOW TEMPERATURE SOLDER

(75) Inventor: John Pereira, Rehoboth, MA (US)

(73) Assignee: Antaya Technologies Corporation, Cranston, RI (US)

( * ) Notice: Subject to any disclaimer, the term of this patent is extended or adjusted under 35 U.S.C. 154(b) by 0 days.

(21) Appl. No.: 09/346,423

(22) Filed: Jul. 1, 1999

Related U.S. Application Data

(60) Provisional application No. 60/126,935, filed on Mar. 29, 1999.

(51) Int. Cl.[7] .............................. B23K 31/02; C22C 28/00
(52) U.S. Cl. ......................................... 228/122.1; 420/555
(58) Field of Search ........................ 228/122.1; 420/555, 420/89, 403, 470

(56) References Cited

U.S. PATENT DOCUMENTS

| | | | |
|---|---|---|---|
| 3,046,651 | | 7/1962 | Olmon et al. ............................ 29/498 |
| 4,785,137 | * | 11/1988 | Samuels ............................ 174/52 FP |
| 5,098,656 | * | 3/1992 | Zimmerman et al. ................ 420/526 |
| 5,256,370 | * | 10/1993 | Slattery et al. ........................ 420/557 |
| 5,580,520 | * | 12/1996 | Slattery et al. ........................ 420/557 |
| 5,652,466 | * | 7/1997 | Hirakawa et al. .................... 257/772 |
| 5,874,043 | * | 2/1999 | Sarkhel et al. ........................ 420/557 |
| 5,939,862 | * | 8/1999 | Yeh et al. .............................. 148/400 |
| 6,010,060 | * | 1/2000 | Sarkhel et al. ..................... 228/179.1 |

FOREIGN PATENT DOCUMENTS

| | | | |
|---|---|---|---|
| 61014096 | | 1/1986 | (EP) ......................................... 35/26 |
| 000787818A1 | * | 8/1997 | (EP) . |
| 02217193A | * | 8/1990 | (JP) . |
| 408064713A | * | 3/1996 | (JP) . |
| 10314980A | * | 12/1998 | (JP) . |
| 2000141078A | * | 5/2000 | (JP) . |

OTHER PUBLICATIONS

Derwent 67698B, 1979.*
Derwent 405307, 2000.*
Derwent 10246S, 1971.*
Andreeva, L. I. et al., "Solder for soldering components of electrovacuum devices," *Chemical Abstracts*, 91(14):111344 (1979).
Andreeva, L. I. et al., "Metal for soldering electrovacuum apparatus," *Chemical Abstracts*, 90(4):27926 (1978).
Hashimoto, Kaoru et al., "Electric connecting device," *Chemical Abstracts*, 106(4):21995 (1979).
Glazer, J., "Metallurgy of low temperature Pb–free solders for electronic assembly," *International Materials Review*, vol. 40, No. 2: pp. 65–93 (1995).
Beal, R.E. and Bader, W.G., "Soldering," Chapter in book Edited by O'Brien, R.L., *Welding Handbook*, vol. 2, Chapter 13: pp. 423–447 (1991).
Bergmann, R., et al., "New solders for automatic soldering," *Fachbeiträge 8*: pp. 86–89, Heft 2 (1996).
Hwang, J.S., "Lead–free Solders," *Modern Solder Technology for Competitive Electronics Manufacturing*, Chapter 15: pp. 483–509, McGraw–Hill (1996).
Sharma, R. and Subrahmanyan, R., "Solder–Bumped Flip Chip Interconnect Technologies: Materials, Processes, Performance, and Reliability," *Flip Chip Technologies*, Chapter 3: pp. 122–154, McGraw–Hill (199?).

(List continued on next page.)

*Primary Examiner*—Patrick Ryan
*Assistant Examiner*—Kiley Stoner
(74) *Attorney, Agent, or Firm*—Hamilton, Brook, Smith & Reynolds, PC

(57) ABSTRACT

The present invention includes a low temperature solder composition having a mixture of elements including indium, tin and silver. Less than about 75% of the composition by weight is tin.

18 Claims, 3 Drawing Sheets

OTHER PUBLICATIONS

Lee, N.–C., "Getting Ready for Lead–free Solders," *Soldering & Surface Mount Technology*, No. 26: pp. 65–69 (1997).

Bhandarkar, S.M., "Solders, Solder Fluxes, and Solder Pastes," *Soldering Processes and Equipment*, Chapter 2: pp. 9–45, Pecht, Michael G., ed., John Wiley & Sons, Inc., New York, NY (1993).

Quan, Y. and Lining, Z., "A Discussion on the Ductility of Rapidly Solidified Cu–Sn–Ag–In Ribbon," *Journal of Nanjing University of Aeronautics and Astronautics*, vol. 30, No. 3, pp. 311–314 (Jun. 1998), and English translation.

* cited by examiner

LOW TEMPERATURE SOLDER

RELATED APPLICATION

This application claims the benefit of U.S. provisional application Ser. No. 60/126,935, filed Mar. 29, 1999, the entire teachings of which are incorporated herein by reference.

BACKGROUND

Windshields and rear windows of vehicles such as automobiles often include electrical devices located within or on the glass. Typically, the electrical devices are antennas or defrosters. In order to provide an electrical connection to such an electrical device, a small area of metallic coating is applied to the glass which is electrically connected to the electrical device. An electrical connector for connecting to a lead or the lead itself is then soldered to the metallic coating on the glass. The solder typically used has a melting point of about 193° C. (380° F.) and requires about 750–800 watt seconds of energy to melt the solder. Heat of this magnitude flows to the glass and often damages the glass in regions near the solder joint, for example, causing cracking.

SUMMARY OF THE INVENTION

The present invention is directed to a solder composition that has a considerably lower melting temperature than solder compositions currently available for soldering to glass. As a result, when the present invention solder composition is employed for soldering components onto a windshield or rear window, the amount of heat that flows to the glass is low enough so that the glass experiences little or no damage. The solder composition of the present invention has a mixture of elements including indium, tin and silver. Less than about 75% of the solder composition by weight is tin.

In preferred embodiments, more than about 25% of the solder composition by weight is indium. More typically, less then about 50% of the composition by weight is tin and more than about 50% of the composition by weight is indium. The solder composition includes the element copper and preferably, the elements within the solder composition have a weight percentage of about 65% indium, about 30% tin, about 4.5% silver and about 0.5% copper. A preferred range of the weight percentage of the solder composition is 64.35%–65.65% indium, 29.7%–30.3% tin, 4.05%–4.95% silver and 0.25%–0.75% copper. The solder composition preferably contains no more than about 0.75% antimony, about 0.08% gold, about 0.2% lead, about 0.08% aluminum, about 0.03% arsenic, about 0.005% cadmium, about 0.005% zinc, about 0.25% bismuth, about 0.02% iron and about 0.005% nickel. The solder composition preferably has a liquidus of about 121° C. and a solidus of about 118° C.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
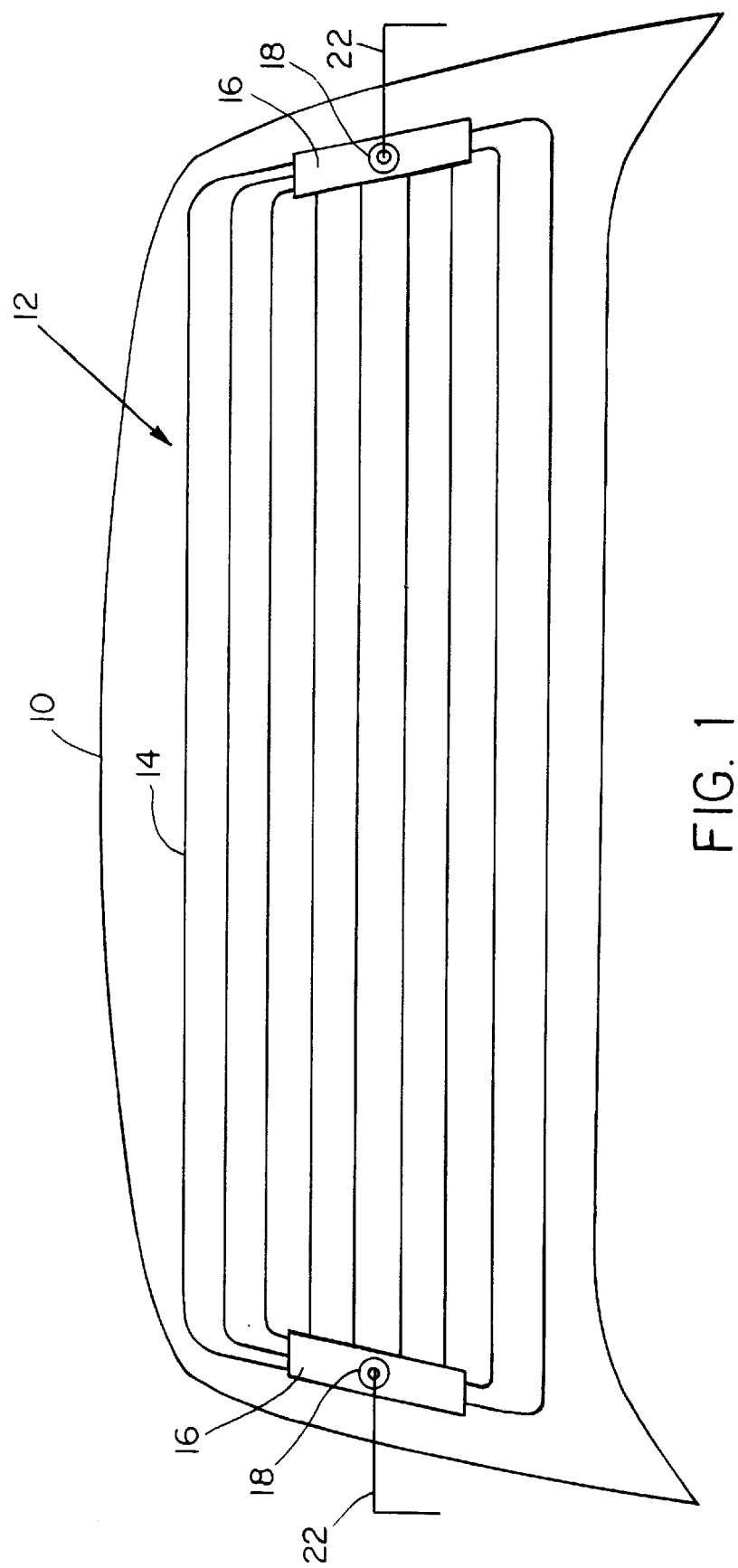
FIG. 1 is an inside view of a rear window of an automobile including an electrically operated defroster.

The present invention provides a solder composition that is suitable for soldering electrical components to glass for electrically connecting to electrical devices within or on the glass. Referring to FIG. 1, the rear window 10 of an automobile is employed as an illustrative example. Window 10 includes a window defroster 12 consisting of electrically resistive defrosting lines 14 embedded within or deposited on the inner surface of window 10. The defrosting lines 14 are electrically connected to a pair of electrical contacts 16 located on the inner surface of the window 10. The electrical contacts 16 consist of a conductive coating deposited on the inner surface of window 10. Preferably, electrical contacts 16 are formed from silver.

Figure 2:
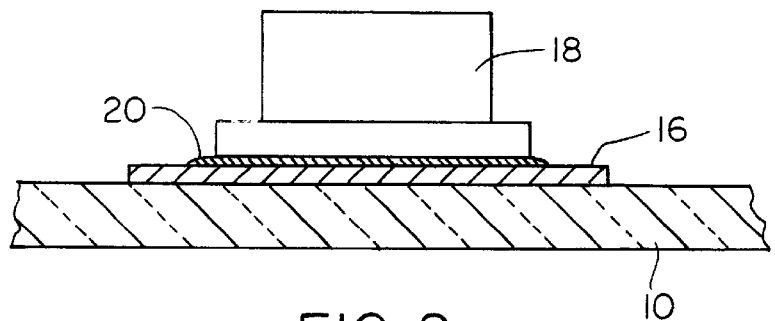
FIG. 2 is a side view of an electrical connector soldered to an electrical contact on the rear window of FIG. 1, with the rear window, electrical contact and solder being shown in section.

Referring to FIG. 2, the solder composition 20 of the present invention is employed to solder an electrical connector 18 to each electrical contact 16 on window 10. Power lines 22 can then be electrically connected to electrical connectors 18 to provide power to window defroster 12 (FIG. 1).

Figure 3:
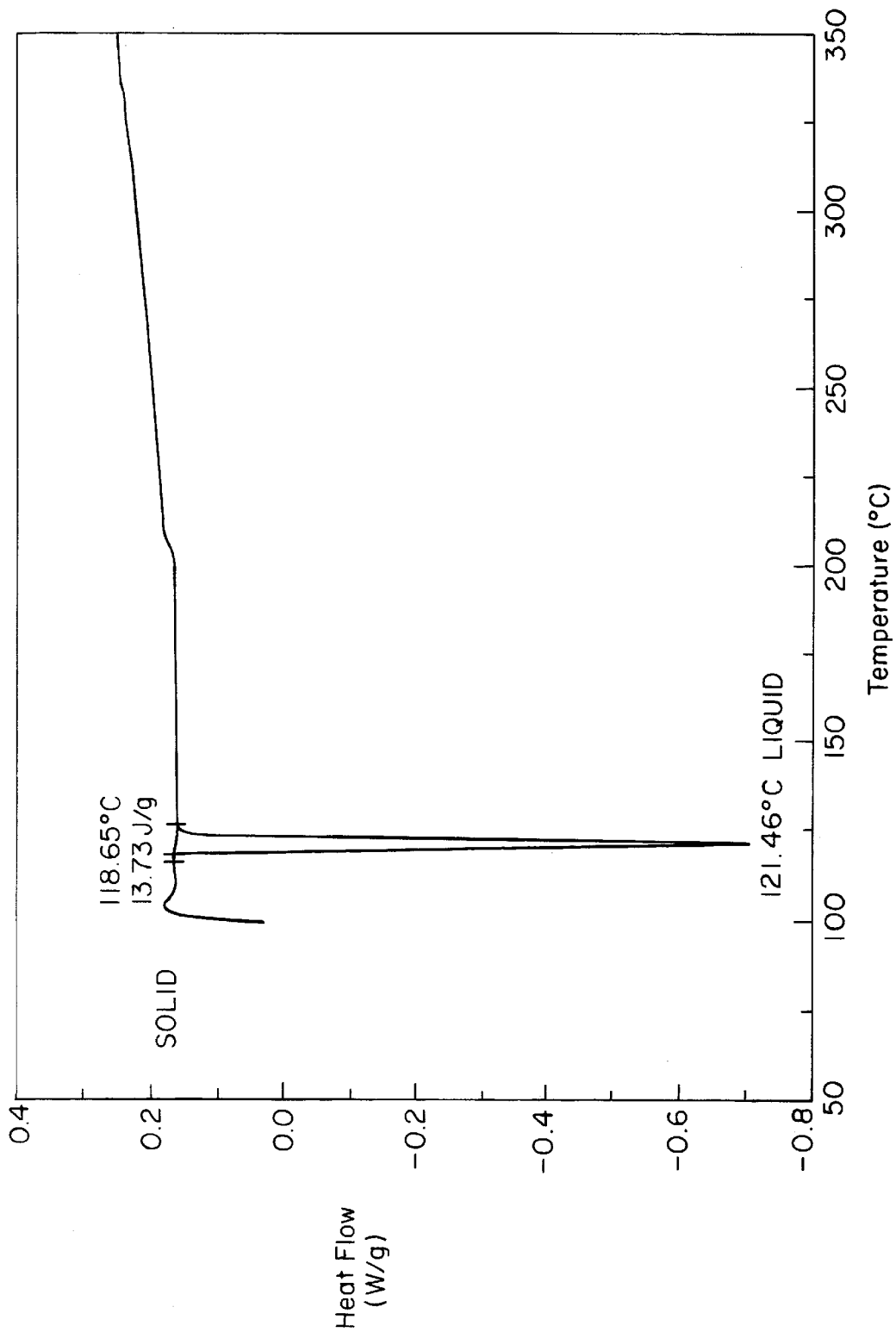
FIG. 3 is a graph depicting heat flow versus temperature of the present invention solder composition when heated.

The present invention solder composition 20 has a solidus temperature of about 118.5° C. (245.3° F.) and a liquidus temperature of about 121.5° C. (250.7° F.) as depicted in FIG. 3. This allows solder composition 20 to be melted during soldering with a low energy input level so that the solder composition 20 and electrical connector 18 are at temperatures which are low enough not to damage window 10. While existing solder compositions typically require at least 750–800 watt seconds of energy input in order to melt, the present invention solder composition 20 can be melted with energy input levels as low as 250 watt seconds. However, energy input levels of between about 300–650 watt seconds provide the greatest strength. Although solder composition 20 has a melting temperature of only about 250° F., the melting temperature is still high enough not to melt during the normal use of a car, for example, when the car is in the sun with the windows closed.

Figure 4:
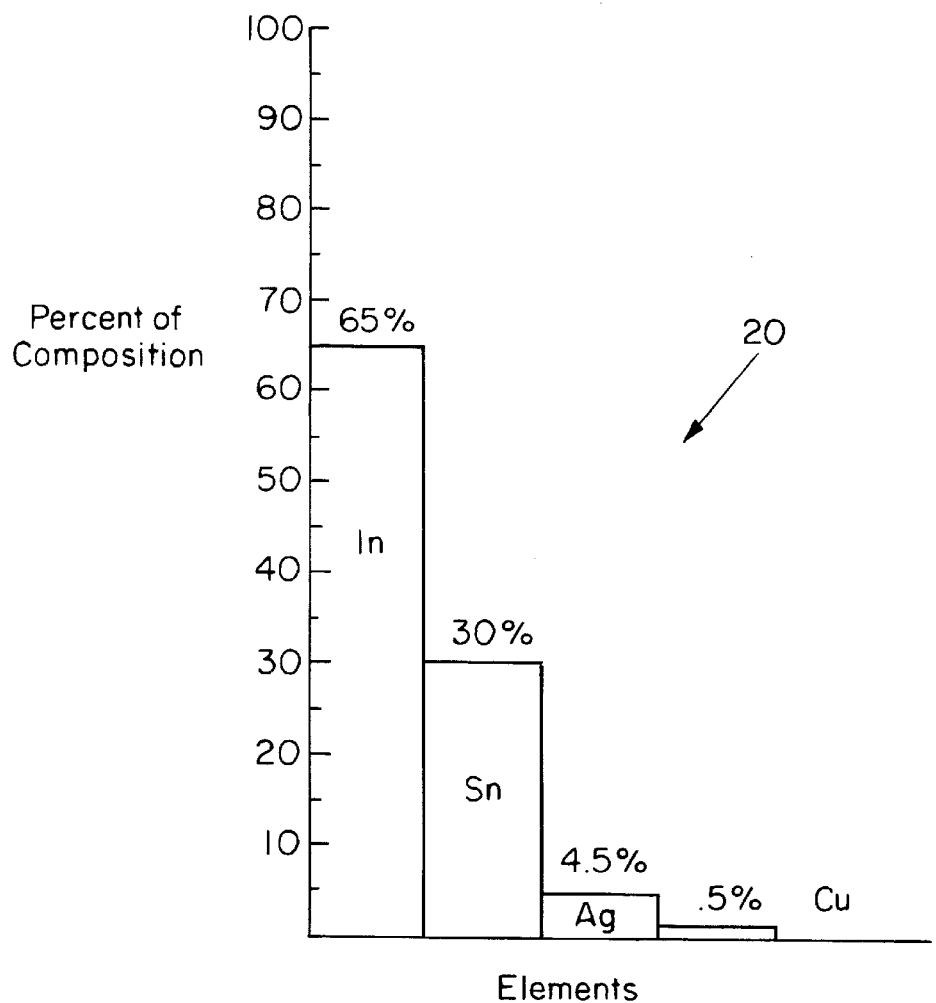
FIG. 4 is a graph depicting the composition of a preferred embodiment of the present invention solder composition.

The low melting temperature of solder composition 20 is achieved by the particular elements present and the relative amounts of those elements within solder composition 20. In the preferred embodiment, solder composition 20 contains about 65% indium (In), 30% tin (Sn), 4.5% silver (Ag) and 0.5% copper (Cu) by weight as depicted in FIG. 4. Solder composition 20 also can contain trace amounts of antimony (Sb), gold (Au), lead (Pb), aluminum (Al), arsenic (As), cadmium (Cd), zinc (Zn), bismuth (Bi), iron (Fe) or nickel (Ni). Solder composition 20 preferably has the following composition ranges:

| | |
|---|---|
| Indium | 64.35–65.65% |
| Tin | 29.7–30.3% |
| Silver | 4.05–4.95% |
| Copper | 0.25–0.75% |
| Antimony | 0.750% max. |
| Gold | 0.080% max. |
| Lead | 0.200% max. |
| Aluminum | 0.080% max. |
| Arsenic | 0.030% max. |
| Cadmium | 0.005% max. |
| Zinc | 0.005% max. |
| Bismuth | 0.250% max. |
| Iron | 0.020% max. |
| Nickel | 0.005% max. |

Levels of antimony, gold, lead, aluminum, arsenic, cadmium, zinc, bismuth, iron or nickel greater than the above specifications can effect the material properties of solder composition 20.

Cracking of automotive window 10 during soldering is limited by limiting the amount of tin in solder composition 20. At tin levels of about 30%, cracking of window 10 is substantially limited or prevented. High percentages of tin tends to crack automotive glass due to the dissimilar coefficients of expansion of automotive glass and tin. The high percentage of indium causes solder composition 20 to have a low melting point or temperature. The presence of silver in solder composition 20 prevents solder composition 20 from scavenging silver from the electrical contact 16 into the solder composition 20. Solder composition 20 preferably should have at least about 3% silver to prevent silver scavenging from electrical contact 16. Finally, the addition of copper to solder composition 20 raises the melting temperature of solder 20 to the desired level.

As can be seen, no lead is added to solder composition 20. As a result, solder composition 20 is lead-free except for the small level of acceptable contamination allowed for as indicated above. Under normal conditions of use in an automobile, solder 20 does not corrode, pit or melt. The low melting point of the present invention solder is at least about 50° C. lower than currently available solders for automotive glass but is still high enough to be above temperatures experienced by automotive glass during the normal use of an automobile as previously mentioned.

To make solder composition 20, ingots of indium, tin, silver and copper are melted and mixed together in the amounts of about 65% indium, 30% tin, 4.5% silver and 0.5% copper. The mixed solder composition 20 is then extruded into a ribbon suitable for soldering. Alternatively, the elements can be melted from powder form.

Although particular percentage figures have been given for the present invention solder composition 20, the percentages of the various elements as well as the presence of particular elements can vary, For example, in another preferred embodiment, solder composition 20 is about 64.95% indium, 30% tin, 4.31% silver, 0.71% copper with the remaining 0.03% of the solder composition having traces of bismuth, cadmium, iron, magnesium, nickel, lead and thallium. Further, depending upon the application at hand, the amount of indium within solder composition 20 can be as low as about 25%. In addition, the amount of tin can be as high as about 75%. However, it is more likely for the amount of tin to be less than 50% and the amount of indium to be greater than about 50%.

In use, soldering of the electrical connectors 18 to the electrical contacts 16 on window 10 with solder composition 20 is preferably conducted by resistance soldering. Alternatively, any conventional soldering apparatus can be employed, for example, a soldering iron. The energy input level for melting solder composition 20 is preferably between 250–650 watt seconds with 300–650 watt seconds being more preferable. This is evidenced by the test results described below from a series of tests where electrical connectors 18 were soldered to a piece of glass and then the force required to pull the electrical connectors from the glass was measured.

EXEMPLIFICATION

Example 1

In the first test, nine groups of four samples were tested. In each group, the electrical connectors 18 were soldered with solder composition 20 to an electrical contact on a glass plate at energy input levels ranging from 250 watt seconds to 650 watt seconds. The electrical connectors 18 were then pulled from the glass and the required force was measured in pounds. The pull strength test was performed at room temperature. The results are listed below as follows:

| 250 Watt Seconds | 300 Watt Second |
| --- | --- |
| 1) 69.0 lbs | 1) 89.1 lbs |
| 2) 53.2 lbs | 2) 94.4 lbs |
| 3) 54.0 lbs | 3) 100+ lbs |
| 4) 59.4 lbs | 4) 99.1 lbs |
| AVG. 58.9 lbs | AVG. 95.7 lbs |

| 350 Watt Seconds | 400 Watt Seconds |
| --- | --- |
| 1) 91.4 lbs | 1) 100+ lbs |
| 2) 88.9 lbs | 2) 70.6 lbs |
| 3) 99.6 lbs | 3) 100+ lbs |
| 4) 100+ lbs | 4) 66.5 lbs |
| AVG. 95 lbs | AVG. 84.3 lbs |

| 450 Watt Seconds | 500 Watt Seconds |
| --- | --- |
| 1) 100+ lbs | 1) 100+ lbs |
| 2) 76.6 lbs | 2) 98.1 lbs |
| 3) 84.0 lbs | 3) 100+ lbs |
| 4) 95.1 lbs | 4) 80.1 lbs |
| AVG. 88.9 lbs | AVG. 94.6 lbs |

| 550 Watt Seconds | 600 Watt Seconds |
| --- | --- |
| 1) 83.5 lbs | 1) 94.5 lbs |
| 2) 100+ lbs | 2) 100+ lbs |
| 3) 100+ lbs | 3) 100+ lbs |
| 4) 94.2 lbs | 4) 100+ lbs |
| AVG. 94.4 lbs | AVG. 98.6 lbs |

| 650 Watt Seconds |
| --- |
| 1) 79.0 lbs |
| 2) 78.8 lbs |
| 3) 100+ lbs |
| 4) 100+ lbs |
| AVG. 89.5 lbs |

Example 2

In the second test, ten electrical connectors 18 were soldered with solder composition 20 to glass at an energy input level of 500 watt seconds with the electrical connectors 18 having a temperature of 407° F. and the glass being at room temperature. The pull strength test results are as follows:

| |
| --- |
| 1) 100+ lbs |
| 2) 94.0 lbs |
| 3) 89.5 lbs |
| 4) 82.9 lbs |
| 5) 100+ lbs |
| 6) 100+ lbs |
| 7) 79.3 lbs |
| 8) 93.0 lbs |
| 9) 97.1 lbs |
| 10) 100+ lbs |
| AVG. 93.6 lbs |

Example 3

In the third test, ten electrical connectors 18 were soldered with solder composition 20 to glass at an energy input level of 500 watt seconds with the electrical connectors have a temperature of 407° F. and the glass being heated to 220° F. when the pull strength test was performed. The pull strength test results are as follows:

| | |
|---|---|
| 1) | 58.8 lbs |
| 2) | 67.2 lbs |
| 3) | 80.4 lbs |
| 4) | 54.2 lbs |
| 5) | 63.3 lbs |
| 6) | 57.7 lbs |
| 7) | 61.8 lbs |
| 8) | 48.8 lbs |
| 9) | 53.9 lbs |
| 10) | 55.4 lbs |
| AVG. | 60.1 lbs |

Example 4

In the fourth test, six groups, each containing five samples were tested. In each group, the electrical connectors 18 were soldered with solder composition 20 to an electrical contact on a glass plate at energy input levels ranging from 250–500 watt seconds and employing type R electro-rosin flux. The pull strength test results are as follows:

| 250 Watt Seconds | 300 Watt Seconds |
|---|---|
| 1) 53.9 lbs | 1) 104.6 lbs |
| 2) 53.0 lbs | 2) 99.7 lbs |
| 3) 79.0 lbs | 3) 125.5 lbs |
| 4) 54.2 lbs | 4) 119.1 lbs |
| 5) 108 lbs | 5) 60.7 lbs |
| AVG. 69.6 lbs | AVG. 101.9 lbs |

| 350 Watt Seonds | 400 Watt Seconds |
|---|---|
| 1) 85.1 lbs | 1) 122.6 lbs |
| 2) 121.2 lbs | 2) 111.5 lbs |
| 3) 127.5 lbs | 3) 108.9 lbs |
| 4) 117.4 lbs | 4) 127.0 lbs |
| 5) 138.4 lbs | 5) 129.7 lbs |
| AVG. 117.9 lbs | AVG. 119.9 lbs |

| 450 Watt Second | 500 Watt Seonds |
|---|---|
| 1) 114.1 lbs | 1) 136.1 lbs |
| 2) 100+ lbs (glass broke) | 2) 115.1 lbs |
| 3) 100+ lbs (glass broke) | 3) 142.9 lbs |
| 4) 100+ lbs (glass broke) | 4) 121.7 lbs |
| 5) 137.4 lbs | 5) 132.7 lbs |
| AVG. 00.0 lbs | AVG. 129.5 lbs |

While this invention has been particularly shown and described with references to preferred embodiments thereof, it will be understood by those skilled in the art that various changes in form and details may be made therein without departing from the spirit and scope of the invention as defined by the appended claims.

For example, although the present invention solder composition 20 has been described for soldering to automotive glass, alternatively, solder composition 20 can be employed for soldering to other types of glass such as used in buildings or any other material where a low melting point solder is desirable. In addition, although particular solidus and liquidus temperatures have been given for solder composition 20, such temperatures can vary depending upon the elements present and the percentages of those elements.

What is claimed is:

1. A solder composition having a mixture of elements comprising indium, tin, silver and copper, in which the elements of the composition have a weight percentage of about 65% indium, about 30% tin, about 4.5% silver and about 0.5% copper.

2. The solder composition of claim 1 in which the composition has a liquidus of about 121° C.

3. The solder composition of claim 1 in which the composition has a solidus of about 118° C.

4. The solder composition of claim 1 in which the elements of the composition have a weight percentage of 64.35%–65.65% indium, 29.7%–30.3% tin, 4.05%–4.95% silver and 0.25%–0.75% copper.

5. The solder composition of claim 4 in which the composition contains no more than about 0.75% antimony, about 0.08% gold, about 0.2% lead, about 0.08% aluminum, about 0.03% arsenic, about 0.005% cadmium, about 0.005% zinc, about 0.25% bismuth, about 0.02% iron and about 0.005% nickel.

6. A solder composition comprising a mixture of elements having a weight percentage of 64.35%–65.65% indium, 29.7%–30.3% tin, 4.05%–4.95% silver and 0.25%–0.75% copper.

7. The solder composition of claim 6 in which the composition contains no more than about 0.75% antimony, about 0.08% gold, about 0.2% lead, about 0.08% aluminum, about 0.03% arsenic, about 0.005% cadmium, about 0.005% zinc, about 0.25% bismuth, about 0.02% iron and about 0.005% nickel.

8. The solder composition of claim 6 in which the composition has a liquidus of about 121° C.

9. The solder composition of claim 6 in which the composition has a solidus of about 118° C.

10. A method of forming a solder composition comprising the step of mixing together elements of indium, tin, silver and copper, with a weight percentage of about 65% indium, about 30% tin, about 4.5% silver and about 0.5% copper.

11. The method of claim 10 which the step of mixing comprises mixing the elements of the composition with a weight percentage of 64.35%–65.65% indium, 29.7%–30.3% tin, 4.05%–4.95% silver and 0.25%–0.75% copper.

12. A method of soldering comprising the steps of:
providing a solder composition having a mixture of elements comprising indium, tin, silver and copper, with a weight percentage of about 65% indium, about 30% tin, about 4.5% silver and about 0.5% copper; and
melting the solder composition with a heat source, the solder composition melting at about 121° C.

13. The method of claim 12 comprising providing the solder composition with a weight percentage of 64.35%–65.65% indium, 29.7%–30.3% tin, 4.05%–4.95% silver and 0.25%–0.75% copper.

14. A solder composition having a mixture of elements comprising indium, tin, silver and copper, the elements of the composition having a weight percentage of more than 50% indium, a maximum of about 30% tin, 3%–4.95% silver and 0.25%–0.75% copper.

15. The solder composition of claim 14 in which the composition has a liquidus of about 121° C.

16. The solder composition of claim 14 in which the composition has a solidus of about 118° C.

17. The solder composition of claim 14 which the weight percentages are 64.35%–65.65% indium, 29.7%–30.3% tin, 4.05%–4.95% silver and 0.25%–0.75% copper.

18. The solder composition of claim 17 in which the composition contains no more than about 0.75% antimony, about 0.08% gold, about 0.2% lead, about 0.08% aluminum, about 0.03% arsenic, about 0.005% cadmium, about 0.005% zinc, about 0.25% bismuth, about 0.02% iron and about 0.005% nickel.

* * * * *